H. GETAZ.
COMPOSITE FILE.
APPLICATION FILED SEPT. 14, 1915.
1,178,310.
Patented Apr. 4, 1916.
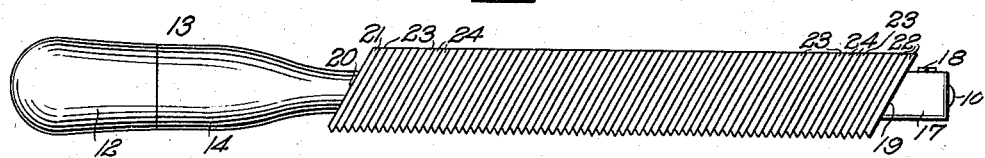
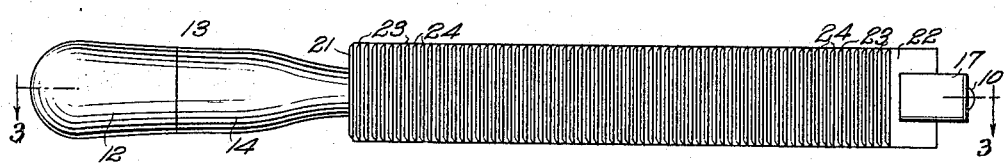
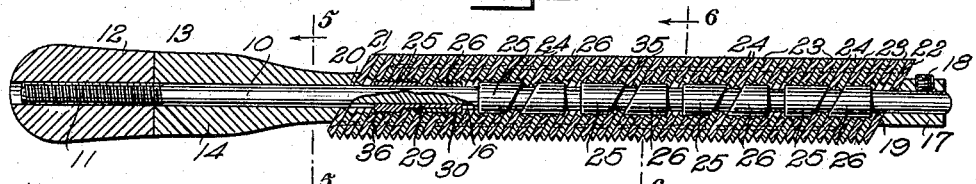
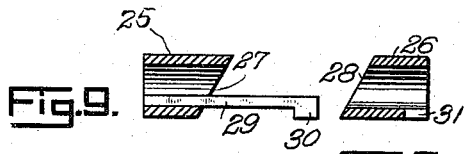
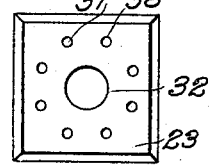
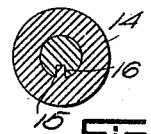
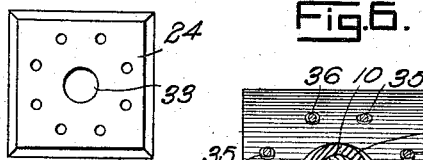
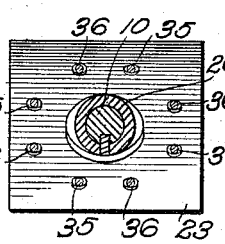
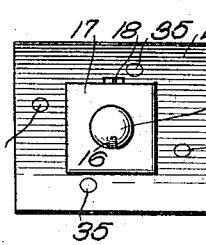
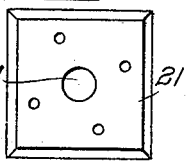
WITNESSES
INVENTOR
Henry Getaz
BY
ATTORNEYS
THE COLUMBIA PLANOGRAPH CO., WASHINGTON, D. C.

UNITED STATES PATENT OFFICE.

HENRY GETAZ, OF PITTSFIELD, MASSACHUSETTS.

COMPOSITE FILE.

1,178,310. Specification of Letters Patent. Patented Apr. 4, 1916.

Application filed September 14, 1915. Serial No. 50,587.

*To all whom it may concern:*

Be it known that I, HENRY GETAZ, a citizen of Switzerland, and a resident of Pittsfield, in the county of Berkshire and State of Massachusetts, have invented a new and Improved Composite File, of which the following is a full, clear, and exact description.

The invention relates to files such as shown and described in the Letters Patent of the United States, No. 858,171 and No. 898,352, granted to me on June 25, 1907, and September 8, 1908, respectively.

One object of the present invention is to provide a new and improved composite file more especially designed for use by metal workers, and arranged to allow convenient sharpening of the cutting edges when dulled by use.

Another object of the invention is to permit of readily assembling the parts and changing the position of the cutting plates to move the cutting edges dulled by use into position for resharpening while other cutting edges move into filing or cutting position. In order to accomplish the desired result, use is made of a spindle, cutting blades each having a plurality of cutting edges, and central openings through which extends the said spindle, means for holding the cutting blades in oblique position on the spindle, and means connecting the cutting blades with each other to allow of turning the cutting blades as a whole.

A practical embodiment of the invention is represented in the accompanying drawings forming a part of this specification, in which similar characters of reference indicate corresponding parts in all the views.

Figure 1 is a plan view of the composite file; Fig. 2 is a side elevation of the same; Fig. 3 is a sectional plan view of the same on the line 3—3 of Fig. 2; Fig. 4 is an enlarged sectional plan view of a pair of sleeves in disassembled position; Fig. 5 is an enlarged cross section of the handle end of the file on the line 5—5 of Fig. 3; Fig. 6 is an enlarged cross section of the file on the line 6—6 of Fig. 3; Fig. 7 is an enlarged elevation of the forward end of the composite file; Fig. 8 is a face view of one of the sleeve blades; Fig. 9 is a similar view of one of the spindle blades; and Fig. 10 is a similar view of one of the end blades.

A spindle or core 10 of cylindrical shape is provided at one end with screw threads 11 on which screws a section 12 of a handle 13 having a second section 14 held loosely on the spindle 10 adjacent the first section 12. The handle section 14 is provided with a key 15 (see Fig. 5) fitting into a keyway 16 on the spindle 10 so as to hold the handle section 14 against turning on the spindle 10 while the handle section 12 can be screwed up on the threaded end 11 of the spindle 10. On the outer end of the spindle 10 is arranged a collar 17 fastened in place by a set screw 18 or other fastening means, and the inner end 19 of the collar 17 is beveled, the inner end 20 of the handle section 14 being likewise beveled and parallel with the beveled end 19 of the collar 17. The beveled end 20 of the handle section 14 abuts against the outer face of a cutting blade 21, and against the beveled face 19 of the collar 17 abuts the outer face of an end cutting blade 22. Between the said end cutting blades 21 and 22 are arranged alternating sets of sleeve cutting blades 23 and spindle cutting blades 24. Each cutting blade 21, 22, 23 and 24 is preferably square and provided along each side with a cutting edge, but I do not limit myself to this particular polygonal shape of the cutting blades as triangular or other polygonal shaped cutting blades may be used. It will be noticed that the several cutting blades are disposed obliquely relatively to the axis of the spindle 10 and the sides of the whole series of cutting blades are in alinement with each other, and the beveled cutting edges of the blades are so arranged that the cutting edges at the top, bottom and to one side of the file are disposed parallel to each other while the cutting edges at the other side of the file are flush with each other (see Figs. 1 and 3), that is, are in the same plane to permit of conveniently sharpening the said flush cutting edges by grinding on an emery wheel or other suitable tool. It is understood that the top and bottom cutting edges are mainly used for filing purposes, but the cutting edges opposite the flush side may also be used for the same purpose.

In order to hold the cutting blades 23, 24 in inclined or oblique position and to allow of tightly clamping the same in oblique position use is made of sleeves 25, 26, arranged in pairs and having their opposite ends 27 and 28 beveled to correspond to the beveled ends 20 and 19 of the handle section 14 and the collar, respectively. The sleeves 25 and 26 slidably engage the spindle 10 and the sleeve 25 is provided with a key 29 slidingly engaging the keyway 16 in the spindle 10 to hold the sleeve 25 from turning. The key 29 projects beyond the beveled end 27 of the sleeve 25 and extends into the sleeve 26, and the outer end of the key 29 is in the form of a hook 30 engaging a slot 31 in the sleeve 26 so that the latter is likewise held against turning on the spindle 10 and at the same time the sleeves 25 and 26 are held spaced apart to accommodate one, two or more of the spindle blades 24 between the beveled edges 27 and 28. It is understood that the sleeve blades 23 are provided with central openings 32 fitting the sleeves 25 and 26 (see Fig. 8), while the spindle blades 24 are provided with central openings 33 fitting the spindle 10, and the end blades 21 are provided with central openings 34 likewise fitting the spindle 10. It will be noticed that by the arrangement described the spindle blades 24 are held in oblique position by abutting against the beveled ends 27 and 28 of the sleeves 25 and 26, and consequently the sleeve cutting blades 23 mounted on the sleeves 25 and 26 are likewise held in this oblique position. Owing to a possible variation in the thickness of the several cutting blades the latter can be tightly clamped together on screwing up the handle section 12 as the sleeves 25 and 26 are spaced apart and are free to slide on the spindle 10 and the pairs of sleeves 25, 26 are likewise spaced apart to allow free movement of the sleeves on the spindle 10.

When the handle section 12 is unscrewed the whole series of cutting blades can be readily turned on the spindle 10 and the sleeves 25 and 26, and in order to facilitate this movement use is made of two sets of pins 35 and 36, of which the pins 35 are inserted lengthwise through registering apertures 37 in the several blades 21, 22, 23 and 24, and the pins 36 are inserted through registering apertures 38 in the said several cutting blades. The pins 35 are inserted lengthwise by way of the end blade 22, and the pins 35 have conical heads engaging countersinks in the apertures 37 of the end blade 22. The pins 36 are inserted by way of the end blade 21 and have likewise conical heads countersunk in the apertures 38 of the end blade 21. By the arrangement of the pins 35 and 36 as described, the blades can be tightly clamped together without interference and without the ends of the pins projecting beyond the end blades 21 and 22. It will be noticed that when the handle section 12 is unscrewed the operator takes hold of the cutting blades and gives the same a quarter turn so as to change the sides of the cutting blades to the different positions mentioned, that is, after one of the three cutting edges has been used and has become dull then a quarter or half turn is given to the cutting blades so that new sets of cutting edges move into top, bottom and side positions while the other previously dulled set of cutting edges moves into flush or grinding position, as previously explained. After the blades are adjusted as described then the handle section 12 is screwed up to securely clamp the center cutting blades in position to allow reuse of the file. The dulled edges which are now in flush position can be readily ground on an emery wheel or other tool so as to become sharp and ready for use after another turning of the cutting blade is had, as above described.

From the foregoing it will be seen that a keen edge is had at the top, bottom and one side of the file for filing or cutting purposes, and the previously dulled edges can be readily resharpened and the cutting blades can be resharpened and used many times as above explained. It will be noticed that the cutting blades practically can be reground from time to time until the apertures 37, 38 are reached. New cutting blades can be readily placed in position on the spindle 10 and sleeves 25 and 26 in lieu of broken or injured ones, that is, the spindle 10, the handle sections 12, 14, the collar 17 and the sleeves 25, 26 can be reused with new sets of cutting blades, and new sets of cutting blades can be furnished so that the file will last for a long time.

It is understood that by providing a cylindrical spindle 10, cylindrical sleeves 25, 26, central holes 32, 33, 34 in the cutting blades and the connecting rods or pins 35, 36, the cutting blades can be turned as a whole on the spindle and sleeves as the axis thus allowing a convenient and quick change in the position of the cutting blades from cutting to grinding position, as above explained.

Having thus described my invention, I claim as new and desire to secure by Letters Patent:

1. A composite file, comprising a spindle, spaced pairs of sleeves mounted on the spindle, the sleeves of a pair being spaced apart, spindle blades fitting on the spindle intermediate the sleeves of a pair, sleeve blades fitting on the sleeves intermediate the said spindle blades, and means for clamping the assembled blades in position on the spindle.

2. A composite file, comprising a spindle having a keyway, spaced pairs of sleeves mounted on the spindle and having keys slidable in the said keyway, the sleeves of a pair being spaced apart and the opposite ends of the sleeves of a pair being provided with parallel bevels, spindle blades held on the spindle intermediate the sleeves of the pairs of sleeves, sleeve blades held on the said sleeves intermediate the spindle blades, and means for clamping the assembled blades in position on the spindle.

3. A composite file, comprising a spindle having a keyway, spaced pairs of sleeves mounted on the spindle and having keys slidable in the said keyway, the key for each pair of sleeves being fastened to one sleeve and projecting into the other sleeve, the terminal of the key being provided with a hook engaging a slot in the said other sleeve, the sleeves of a pair being spaced apart and the opposite ends of the sleeves of a pair being provided with parallel bevels, spindle blades held on the spindle intermediate the sleeves of the pairs of sleeves, sleeve blades held on the said sleeves intermediate the spindle blades, and means for clamping the assembled blades in position on the spindle.

4. A composite file, comprising a spindle, spaced pairs of sleeves mounted on the spindle, the sleeves of a pair being spaced apart, spindle blades fitting on the spindle intermediate the sleeves of a pair, sleeve blades fitting on the sleeves intermediate the said spindle blades, pins extending through the assembled blades to allow of turning the same as a whole on the spindle, and means for clamping the assembled blades in position on the spindle.

5. A composite file, comprising a spindle, spaced pairs of sleeves mounted on the spindle, the sleeves of a pair being spaced apart, spindle blades fitting on the spindle intermediate the sleeves of a pair, sleeve blades fitting on the sleeves intermediate the said spindle blades, a collar removably secured to one end of the spindle for the outermost blade to abut against, and a handle held on the other end of the spindle and made in two parts, of which one screws on the spindle and the other is mounted to slide on the spindle to engage the innermost blade.

6. A composite file, comprising a spindle, spaced pairs of sleeves mounted on the spindle, the sleeves of a pair being spaced apart, spindle blades fitting on the spindle intermediate the sleeves of a pair, sleeve blades fitting on the sleeves intermediate the said spindle blades, a set of pins extending through the assembled blades from one end, a second set of pins extending through the assembled blades from the other end, and means for clamping the assembled blades in position on the spindle.

7. A composite file, comprising a spindle, cutting blades each having a plurality of cutting edges and central openings through which extends the said spindle, means for holding the cutting blades in oblique position on the spindle, and means for connecting the cutting blades with each other to allow of turning the cutting blades as a whole.

In testimony whereof I have signed my name to this specification in the presence of two subscribing witnesses.

HENRY GETAZ.

Witnesses:
FRANK J. KNIGHT,
ITALE IMWEENZ.

Copies of this patent may be obtained for five cents each, by addressing the "Commissioner of Patents, Washington, D. C."